D. SAIGEON.
Sulky-Harrows.

No. 157,872. Patented Dec. 15, 1874.

WITNESSES:
E. Wolff
A. F. Terry

INVENTOR:
David Saigeon
BY Munn & Co.
ATTORNEYS.

THE GRAPHIC CO. PHOTO-LITH. 39 & 41 PARK PLACE, N.Y.

UNITED STATES PATENT OFFICE.

DAVID SAIGEON, OF WATTSBURG, PENNSYLVANIA.

IMPROVEMENT IN SULKY-HARROWS.

Specification forming part of Letters Patent No. 157,872, dated December 15, 1874; application filed October 3, 1874.

*To all whom it may concern:*

Figure 1:
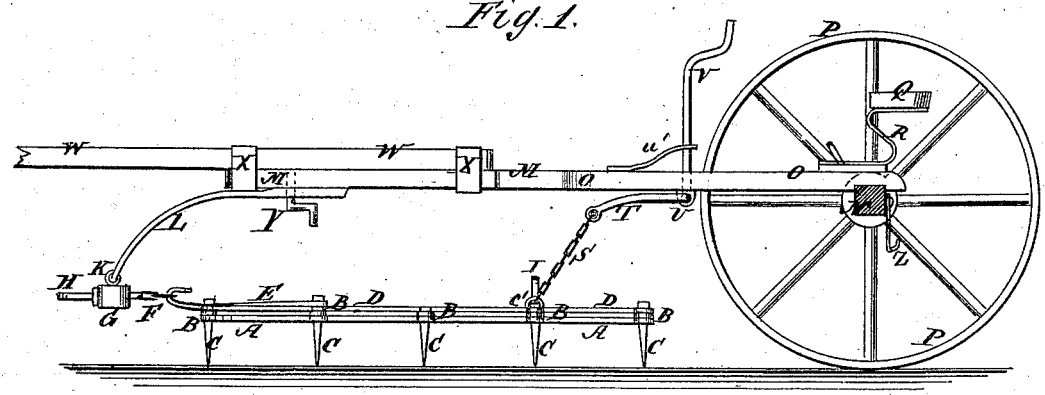
Figure 2:
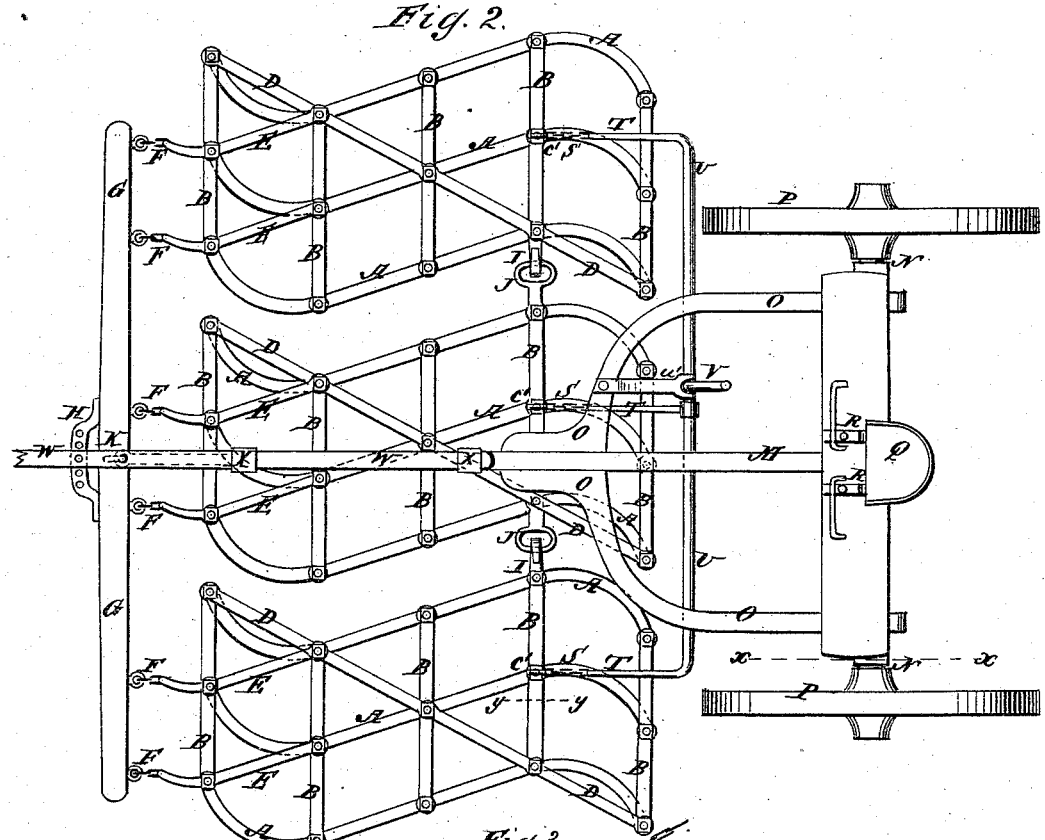
Figure 3:
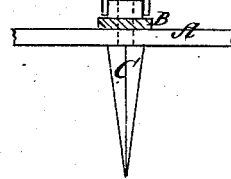

Be it known that I, DAVID SAIGEON, of Wattsburg, in the county of Erie and State of Pennsylvania, have invented a new and useful Improvement in Sulky-Harrow, of which the following is a specification:

Figure 1 is a side view of my improved sulky-harrow, partly in section, through the line $x$ $x$, Fig. 2. Fig. 2 is a top view of the same. Fig. 3 is a detail section taken through the line $x$ $x$, Fig. 2.

Similar letters of reference indicate corresponding parts.

The invention is an improvement in the class of harrows formed of sections hinged together, and connected to a wheeled frame.

The invention lies in the construction and arrangement of parts as hereinafter described, and specified in the claims.

The harrow is made in three sections, each section being formed of three, more or less, S-shaped parallel bars, A, connected by five, more or less, cross-bars, B. The S-bars A and the cross-bars B of the sections are secured to each other, at their points of intersection, by the shanks of the harrow-teeth C, which pass through holes in the said bars A B, and are secured in place by nuts screwed upon their upper ends. The section-frames are farther strengthened by inclined brace-bars D, crossing said frames diagonally from the outer end of one of the side S-bars A to the outer end of the other side S-bars A, as shown in Fig. 2, and which are secured to the said S and cross bars A B by the shanks of the teeth C, which pass through them. By this construction, when the sections are drawn forward squarely no two teeth will follow in the same line, and the paths of the teeth will be equally distant from each other. E are two bars, which are secured to the two forward cross-bars B of the section-frames at their points of intersection with the S-bars A by the shanks of the teeth C, so as to be in line with the middle parts of the said bars A. The forward ends of the bars E project in front of the front cross-bars B, have hooks formed upon them, and are bent to one side, as shown in Fig. 2, to bring the points of draft attachment into such a position that the sections will be drawn forward squarely, while allowing the said hook-bars E to be secured by the shanks of the teeth C. F are short chains, which are hooked upon the hooks of the hook-bars E, and the other ends of which are connected by eye-bolts, staples, or clevises with the long draw-bar G. To the forward side of the middle part of the draw-bar G is attached a long staple, H, having a number of holes formed in it for the attachment of the draft, to enable the point of draft attachment to be adjusted as required. Upon the inner end of the next to the rear cross-bars B of the side sections are formed hooks I, which are hooked into eyes J, formed upon the ends of the next to the rear cross-bar B of the center section, to form a flexible or hinge connection between the rear parts of said sections for keeping their rear ends in proper relative positions while allowing them to conform to irregularities in the surface of the ground. In the center of the draw-bar G is formed a hole to receive an eye-bolt, K, the eye of which interlocks with the eye formed in the forward end of the curved arm L, the rear end of which is secured to the under side of the forward end of the tongue M. The rear end of the tongue M is rigidly attached to the center of the axle N, and the said tongue is strengthened by hounds O, rigidly attached to it and to the said axle. P are the sulky-wheels, which revolve upon the journals of the axle N. Q is the driver's seat, the spring standards or supports R of which are secured to a board attached to the tongue M and hounds O above the axle N, so that the driver's weight may be above and over said axle. The nut of the central tooth C of the next to the rear cross-bars B of each section is made with a loop, $c'$, to which is secured, by a snap-hook, or other suitable connection, the end of a chain, S. The other ends of the three chains S are attached to the ends of arms T, formed upon, or rigidly attached to, a bar or shaft, U, which works in bearings attached to the hounds O, and to which is also rigidly attached a lever, V, which projects into such a position that it may be conveniently reached and operated by the driver from his seat. W is an extension-tongue, which is placed in keepers X, attached to the forward part of the tongue M, and secured by a set-screw, Y, or other convenient means. The extension-tongue W is designed for use when taking the machine from place to place. When the machine is at work the extension-tongue W is reversed, and secured in the keepers X with its forward end projecting back beneath the driver's seat.

With this construction, when the harrow is under the draft-strain, or when the extension-tongue W is in use, by operating the lever V the harrow-sections may be raised from the ground to pass obstructions, or to pass from place to place. When passing from place to place the harrow-sections may be held suspended by a hook, Z, pivoted to the axle N, and which is hooked over the lever V. The lever V may be kept from being swung too far forward by the weight of the chains S and arms T by a stop, $v$, attached to the hounds O.

Having thus described my invention, what I claim as new, and desire to secure by Letters Patent, is—

1. The nuts of the teeth C, having loops $c'$, as shown and described.

2. The draw-bar G, the curved arm L, attached to the tongue M, the chains F, and the harrow-sections, all combined as shown and described, whereby the harrows and wheeled frame are connected for the purposes specified.

DAVID SAIGEON.

Witnesses:
WALTER HAYES,
SAMUEL MOORE.